United States Patent
Keller

(10) Patent No.: US 10,620,055 B2
(45) Date of Patent: Apr. 14, 2020

(54) COOKING THERMOMETERS AND MULTI-FUNCTION COOKING TOOLS HAVING COUNT-UP TIMERS

(71) Applicant: Maverick Industries, Inc., Edison, NJ (US)

(72) Inventor: Darren Keller, Easton, PA (US)

(73) Assignee: Maverick Industries, Inc., Edison, NJ (US)

( * ) Notice: Subject to any disclaimer, the term of this patent is extended or adjusted under 35 U.S.C. 154(b) by 23 days.

(21) Appl. No.: 15/676,710

(22) Filed: Aug. 14, 2017

(65) Prior Publication Data

US 2019/0049313 A1 Feb. 14, 2019

(51) Int. Cl.
| | |
|---|---|
| *G01K 1/02* | (2006.01) |
| *G01K 13/00* | (2006.01) |
| *G01K 1/08* | (2006.01) |
| *G01K 7/04* | (2006.01) |
| *G01K 7/02* | (2006.01) |

(52) U.S. Cl.
CPC ............... *G01K 1/028* (2013.01); *G01K 1/08* (2013.01); *G01K 7/02* (2013.01); *G01K 7/04* (2013.01); *G01K 13/00* (2013.01); *G01K 2207/06* (2013.01)

(58) Field of Classification Search
CPC .. G01K 1/14; G01K 13/00; B67B 2007/0488; B67B 7/04; B67B 7/44
USPC ....... 374/179, 141, 142, 208, 100, 101, 102, 374/163, 149, 170
See application file for complete search history.

(56) References Cited

U.S. PATENT DOCUMENTS

| | | | |
|---|---|---|---|
| 5,435,235 A * | 7/1995 | Yoshida | A21B 7/005 366/146 |
| 5,617,597 A | 4/1997 | Reitz | |
| 5,634,719 A | 6/1997 | LaNeve | |
| 5,899,569 A | 5/1999 | Favale | |
| 5,983,783 A | 11/1999 | Archer | |
| 6,000,845 A | 12/1999 | Tymkewicz | |
| 6,536,370 B2 * | 3/2003 | Paton | G01N 31/222 116/206 |

(Continued)

FOREIGN PATENT DOCUMENTS

| | | | |
|---|---|---|---|
| JP | 361271432 A | * | 12/1986 |
| JP | 362038327 A | * | 2/1987 |

(Continued)

*Primary Examiner* — Gail Kaplan Verbitsky
(74) *Attorney, Agent, or Firm* — Doherty IP Law Group LLC

(57) ABSTRACT

A multi-function cooking tool includes a housing, an electronic visual display provided on the housing, and a temperature probe coupled with the housing. The temperature probe is moveable between a first position in which the temperature probe is stored inside the housing and a second position in which the temperature probe extends from the housing. A control system is disposed in the housing and is in communication with the temperature probe and the visual display. When the temperature probe is in the second position the control system is programmed to display information on the visual display that corresponds to temperature readings sensed by the temperature probe. When the temperature probe is returned from the second position to the first position the control system commences a count-up timer program that displays on the visual display the amount of time that has elapsed since the temperature probe was moved from the second position to the first position.

20 Claims, 7 Drawing Sheets

(56) References Cited

U.S. PATENT DOCUMENTS

| | | | |
|---|---|---|---|
| 6,539,842 B1 | 4/2003 | Chapman et al. | |
| 7,306,366 B1 | 12/2007 | Camenzind et al. | |
| 7,520,668 B2 | 4/2009 | Chen | |
| 7,613,210 B2* | 11/2009 | Takehara | G06Q 10/109 370/503 |
| 8,235,591 B2* | 8/2012 | Harris | G01J 5/0037 374/121 |
| 8,240,914 B1 | 8/2012 | Chapman et al. | |
| 9,971,286 B2* | 5/2018 | Kikegawa | G03G 15/2039 |
| 2001/0040911 A1* | 11/2001 | Rubenstein | G01K 1/14 374/141 |
| 2002/0073853 A1* | 6/2002 | Norcross | A47J 43/283 99/342 |
| 2002/0150144 A1* | 10/2002 | Chapman | A23G 3/04 374/189 |
| 2006/0118534 A1* | 6/2006 | Casner | B23K 9/1062 219/130.21 |
| 2006/0203878 A1* | 9/2006 | Pearl | B65H 35/002 374/141 |
| 2009/0012656 A1* | 1/2009 | Uchiyama | B29C 45/762 700/306 |
| 2009/0324785 A1* | 12/2009 | Ceravalls Pujol | G01K 1/14 426/231 |
| 2010/0013543 A1* | 1/2010 | Kang | G01K 7/00 327/512 |
| 2013/0196038 A1* | 8/2013 | Liu | A47J 37/1266 426/233 |

FOREIGN PATENT DOCUMENTS

| | | | |
|---|---|---|---|
| JP | 11099058 A | * | 4/1999 |
| JP | 3420418 B2 | * | 6/2003 |
| JP | 6145741 B1 | * | 6/2017 |

* cited by examiner

COOKING THERMOMETERS AND MULTI-FUNCTION COOKING TOOLS HAVING COUNT-UP TIMERS

BACKGROUND OF THE INVENTION

Field of the Invention

The present patent application is generally related to cooking, and is more specifically related to electronic temperature probes and timers used for monitoring cooking operations.

Description of the Related Art

The accurate and reliable measurement of temperatures is particularly important in the food preparation industry. Cooking to exact temperature ranges is also critical in gourmet cooking and to avoid undercooking food items. As a result, a number of devices have been developed to accurately measure the temperature of food items being cooked.

For example, U.S. Pat. No. 5,983,783 to Archer discloses an electronic chef's fork which displays indicia such as food type and degree of doneness for a selected food type and temperature, and which includes control areas by which a user selects a meat type. The electronic chef's fork includes operational circuitry that enables a user to select among an array of food type options and to designate a degree of doneness for the selected food types. A prompt message is provided to indicate the degree of doneness attained for the selected food type when the device is inserted into food.

U.S. Pat. No. 8,240,091 to Chapman et al., assigned to Maverick Industries, Inc. discloses a wireless remote cooking thermometer system includes a first unit positionable at a first location adjacent food being cooked, the first unit including a radio frequency transmitter adapted to transmit a temperature signal associated with temperature readings of the food being cooked. The system also includes at least one microprocessor operative to calibrate taste and choice preferences. The system also includes a temperature probe and a second unit that includes a noise generator or visual indicator and a radio frequency receiver for reception of the signal from the transmitter.

U.S. Pat. No. 6,539,840 to Chapman et al., assigned to Maverick Industries, Inc., discloses a rotisserie system includes a rotatable skewer adapted to secure meat, the rotatable skewer including a temperature sensor for recording a temperature of the meat and a wireless transmitter for wirelessly transmitting the temperature. The system also includes a remote temperature monitor having a wireless receiver for receiving the wirelessly transmitted temperature and a visual display for displaying the temperature, whereby the remote temperature monitor is movable away from the rotatable skewer while remaining in wireless communication with the wireless transmitter to enable an operator to continuously monitor the cooking temperature of the meat. The wireless transmission and reception may be accomplished using infrared light or radio frequency waves.

Many temperature monitoring devices have been incorporated into devices having extendable temperature probes or devices that perform multiple functions.

For example, U.S. Pat. No. 6,000,845 to Tymkewicz et al. discloses a temperature sensing and indicating device including a housing and an arm that is retractable and extendable into and out of the housing so that the length of the arm can be varied in a predetermined manner. A probe having a temperature sensor therein is enclosed by the arm so that varying the external length of the arm exposes varying lengths of the probe, whereby the exposed length of the probe is inserted into a medium so that the temperature sensor senses the temperature of the medium and converts the temperature sensed into a signal. Using a microprocessor, the signal is conditioned and converted for controlling a visual display that provides a visual indication of the temperature sensed. The visual indication includes a digital numeric display and an analog display.

U.S. Pat. No. 5,634,719 discloses a food-handling device which a retractable boom mounted temperatures probe. The tool has a probe mounted on a manually retractable boom, the probe being extendable over various sites of the food being checked. The boom is pivotally attached to the elongated arm of a spatula and, by a scissor-like action, is raised out of and lowered into the food. The tool is provided with a temperature indicator in the form of a digital readout.

U.S. Pat. No. 7,306,366 to Camenzind et al. discloses a pocket knife having multifunctional tools such as an altitude indicator, a compass, a barometer, a thermometer, a hygrometer, an anemometer, a speed indicator, a balance and/or a satellite navigation device.

U.S. Pat. No. 7,520,668 to Chen discloses a multi function thermometer that operates to display temperatures sensed by one or more temperature sensors. The thermometer has a thermometer housing and a temperature probe engaged to the housing, the probe being translatable between a first stowed position and a second deployed position. An infrared temperature reader element is also engaged to the housing, and operative to sense the temperature of objects remote from the housing, within a field of view of the infrared reader element. A temperature display is connected to the retractable probe and to the infrared temperature reader element. The display is operative to display temperatures sensed by the retractable probe and/or the infrared reader element.

In spite of the above advances, there remains a need for improved cooking thermometers and temperature monitoring systems that enable operators to easily determine how much time has elapsed since the last temperature reading has been obtained for a food item being cooked. There also remains a need for improved multi-function tools that may be used by cooks.

SUMMARY OF THE INVENTION

In one embodiment, a multi-function cooking tool preferably includes a housing having a proximal end and a distal end, an electronic visual display provided on the housing, and a temperature probe coupled with the housing, whereby the temperature probe is moveable between a first position in which the temperature probe is stored inside the housing and a second position in which the temperature probe extends from the housing for obtaining temperature readings.

In one embodiment, the multi-function tool desirably includes a control system disposed in the housing that is in communication with the temperature probe and the electronic visual display. In one embodiment, when the temperature probe is in the second position, the control system is programmed to display information on the electronic visual display that corresponds to temperature readings sensed by the temperature probe. In one embodiment, when the temperature probe is returned from the second position to the first position, the control system is programmed to commence a count-up timer program that displays on the electronic visual display the amount of time that has elapsed since the temperature probe was moved from the second position to the first position.

In one embodiment, the count-up timer program counts up from zero to infinity to indicate the amount of time that has elapsed since the last temperature reading. In one embodiment, the count-up timer program counts up from zero to 99 minutes, 59 seconds.

In one embodiment, the temperature probe has a proximal end that is pivotally coupled with the distal end of the housing for enabling the temperature probe to pivot between the first position in which the probe is stored inside the housing and the second position in which the probe extends distally beyond the distal end of the housing.

In one embodiment, the housing includes a storage recess formed in a side of the housing that is adapted to receive a distal end of the temperature probe when the temperature probe is in the first position. In one embodiment, the multi-function cooking tool preferably has a temperature probe release button provided on the housing. In one embodiment, the temperature probe release button has a lock position for locking the temperature probe in the first position inside the temperature probe storage recess and a release position for unlocking the temperature probe for enabling the temperature probe to pivot between the first position and the second position.

In one embodiment, the temperature probe has a distal end including a distal tip that contains a thermocouple sensor adapted to sense the temperature readings and transmit the sensed temperature readings to the system controller.

In one embodiment, the housing desirably includes an eyelet located adjacent the proximal end of the housing for enabling the multi-function cooking tool to be hung.

In one embodiment, the multi-function cooking tool preferably includes a control button accessible on the housing for interacting with the system controller and controlling operation of the tool.

In one embodiment, the multi-function cooking tool is a pocket knife, and the housing contains a plurality of tools moveable between retracted and extended positions. In one embodiment, the plurality of tools may include a knife, a corkscrew, a bottle opener and/or a screw driver.

In one embodiment, a multi-function cooking tool preferably includes a housing having a proximal end and a distal end, an electronic visual display provided on the housing, and a temperature probe having a proximal end pivotally coupled with the housing and a distal end. In one embodiment, the temperature probe is pivotable between a first position in which the distal end of the temperature probe is stored inside the housing and a second position in which the distal end of the temperature probe extends beyond the distal end of the housing.

In one embodiment, the multi-function cooking tool desirably includes a control system disposed in the housing and being in communication with the temperature probe and the electronic visual display. In one embodiment, when the temperature probe is pivoted from the first position to the second position, the control system is programmed to display information on the electronic visual display that corresponds to the temperature readings sensed by the distal end of the temperature probe. In one embodiment, when the temperature probe is pivoted back from the second position to the first position, the control system is programmed to commence a count-up timer program that displays on the electronic visual display the amount of time that has elapsed since the temperature probe was pivoted back from the second position to the first position.

In one embodiment, a multi-function cooking tool preferably includes a housing having a proximal end and a distal end, whereby the housing contains a plurality of tools moveable between retracted and extended positions. In one embodiment, the multi-function cooking tool desirably includes an electronic visual display provided on the housing, and a temperature probe having a proximal end pivotally coupled with the housing and a distal end spaced from the proximal end. In one embodiment, the temperature probe is pivotable between a first position in which the distal end of the temperature probe is stored inside the housing and a second position in which the distal end of the temperature probe extends distally beyond the distal end of the housing.

In one embodiment, the multi-function cooking tool desirably includes a control system disposed in the housing and being in communication with the temperature probe and the electronic visual display. In one embodiment, when the temperature probe is pivoted from the first position to the second position, the control system is programmed to display information on the electronic visual display that corresponds to the temperature readings sensed by the distal end of the temperature probe. In one embodiment, when the temperature probe is pivoted from the second position back to the first position, the control system is programmed to commence a count-up timer program that displays on the electronic visual display the amount of time that has elapsed since the temperature probe was pivoted from the second position back to the first position.

These and other preferred embodiments of the present invention will be described in more detail below.

BRIEF DESCRIPTION OF THE DRAWINGS

FIG. 1C-1 shows a magnified view of a proximal end of the bottom of the cooking thermometer shown in FIG. 1C.

DETAILED DESCRIPTION OF PREFERRED EMBODIMENTS

Figure 1A:
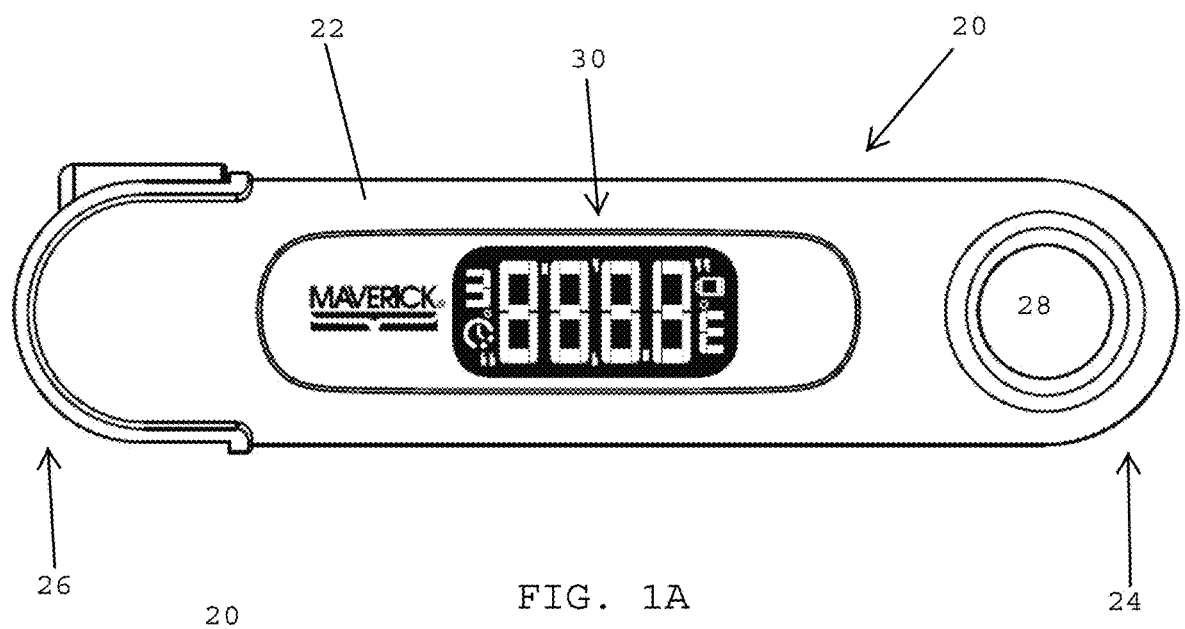
FIG. 1A shows a top plan view of a cooking thermometer, in accordance with one embodiment of the present patent application.

Referring to FIG. 1A, in one embodiment, a cooking thermometer 20 for obtaining internal temperature readings for food items being cooked preferably includes a housing 22 having a proximal end 24 and a distal end 26. In one embodiment, the proximal end 24 of the housing 22 includes an eyelet 28 that defines an opening extending from a top side to a bottom side of the housing 22. In one embodiment, the eyelet 28 enables the cooking thermometer 22 to be hung from a structure, such as a hook or a nail.

In one embodiment, the cooking thermometer 20 desirably includes a visual display 30, such as an LCD display, located on a top surface of the housing 22. In one embodiment, the visual display 30 is designed to display different information to a user such as temperature readings, whether the displayed temperature is in Fahrenheit or Celsius, remaining battery power, a count up timer, and the operating mode for the cooking thermometer. In one embodiment, the visual display 30 may rotate 180 degrees to accommodate left-handed or right-handed use of the cooking thermometer 20. The 180 degree rotation may be controlled by an operator by engaging a control button. In one embodiment, the visual display 30 has a length of about 1-2 inches, and more preferably about 1.5 inches, and a width of about 0.5-1 inches, and more preferably about 0.67 inches. In one embodiment, the visual display 30 is adapted to provide a reverse white LCD display for night time viewing. Toggling between the day time display and the reverse white LCD display may be controlled by a user or may occur automatically when the ambient light dims (e.g., using a light sensor provided on the housing).

Figure 1B:
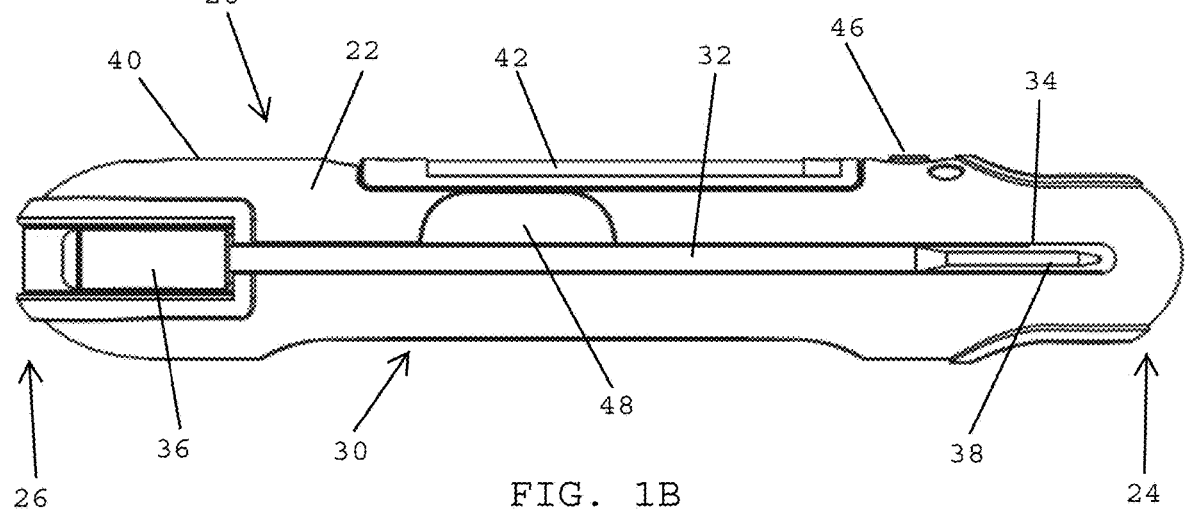
FIG. 1B shows a front elevation view of the cooking thermometer shown in FIG. 1A.

Referring to FIGS. 1A and 1B, in one embodiment, the cooking thermometer 20 preferably includes a temperature probe 32 that is secured to the housing 22. The temperature probed is desirably in communication with a central processing unit located in the housing that obtains signals from the temperature probe, transforms the signals into a temperature reading, and displays the temperature reading on the visual display 30. In one embodiment, the temperature probe 32 has a length of about 100-150 mm, and more preferably about 120 mm, and a diameter of about 3-4 mm, and more preferably about 3.5 mm. In one embodiment, the temperature probe 32 is adapted to move between a closed position in which the temperature probe is stored inside the housing 22 and is not being utilized for monitoring temperatures, and an open position during which the temperature probe is being utilized for monitoring temperatures. When in the open position, the temperature probe may be extended from the distal end 26 of the housing 22.

In one embodiment, the housing 22 has a storage recess 34 formed therein for accommodating the temperature probe 32 when the temperature probe is in the closed position. In one embodiment, a proximal end 36 of the temperature probe 32 is rotatably or pivotally secured to the distal end 26 of the housing 22. The rotatable connection between the temperature probe 32 and the housing 22 enables the temperature probe to be rotated from the closed position shown in FIG. 1B to an extended, open position in which a tip 38 of the temperature probe 32 extends beyond the distal end 26 of the housing 22. In one embodiment, the tip 38 contains a thermocouple sensor adapted to read temperatures between −40 and 450 degrees Fahrenheit (i.e., between −40 and 232 degrees Celsius). In one embodiment, the thermocouple sensor is a Type K Chromel Alumel, ungrounded sensor.

Figure 1C:
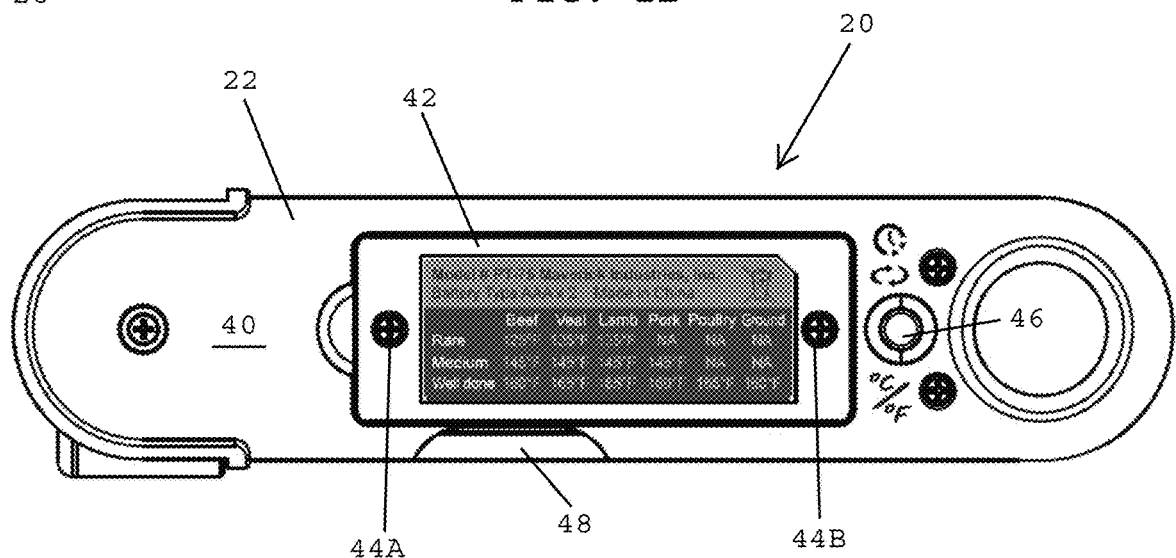
FIG. 1C shows a bottom of the cooking thermometer shown in FIGS. 1A and 1B.

Referring to FIGS. 1B and 1C, in one embodiment, the housing 22 has a bottom surface 40 and a battery cover 42 that is releasably secured to the bottom of the housing 22. In one embodiment, the battery cover 42 may be held in place utilizing a pair of fasteners, such as screws 44A, 44B. In one embodiment, the housing 22 has a battery compartment configured to receive a power supply (e.g., batteries) for providing power to the cooking thermometer 20. After the batteries have been inserted into the battery compartment, the power supply cavity cover 42 is desirably positioned over the batteries and the battery compartment and the screws 44A, 44B are tightened for holding the battery cover 42 in place at the bottom of the housing 22.

In one embodiment, the cooking thermometer 20 includes a control button 46 accessible at the bottom surface 40 of the housing 22. In one embodiment, the control button 46 may be engaged (e.g., pressed) for turning the cooking thermometer to an "on" state. In one embodiment, the control button 46 may be engaged for displaying temperatures in either Fahrenheit or Celsius. In one embodiment, the control button 46 may be engaged for selectively rotating the visual display 30 by 180 degrees (FIG. 1A) into either an upright configuration or an inverted configuration for left-hand or right-hand operation.

Figures 1, 1C:
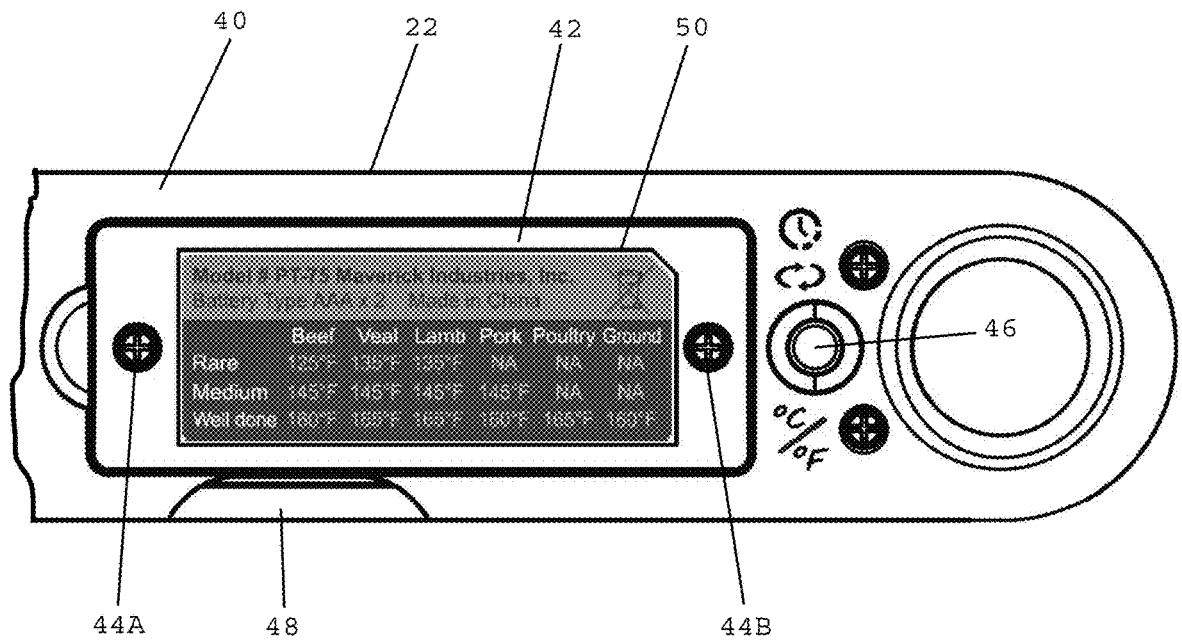

Referring to FIGS. 1B, 1C and 1C-1, in one embodiment, the cooking thermometer 20 preferably includes a temperature probe release button 48 provided on the housing 22. In one embodiment, the temperature probe release button 48 is located between the battery cover 42 and the temperature probe 32. In one embodiment, the temperature probe release button 48 is depressed for unlocking the temperature probe 32 so that it may move between the closed configuration shown in FIGS. 1B and 1C and an open configuration (FIG. 3) in which the distal tip 38 of the temperature probe 32 may be extended beyond the distal end 26 of the housing 22.

Figure 2:
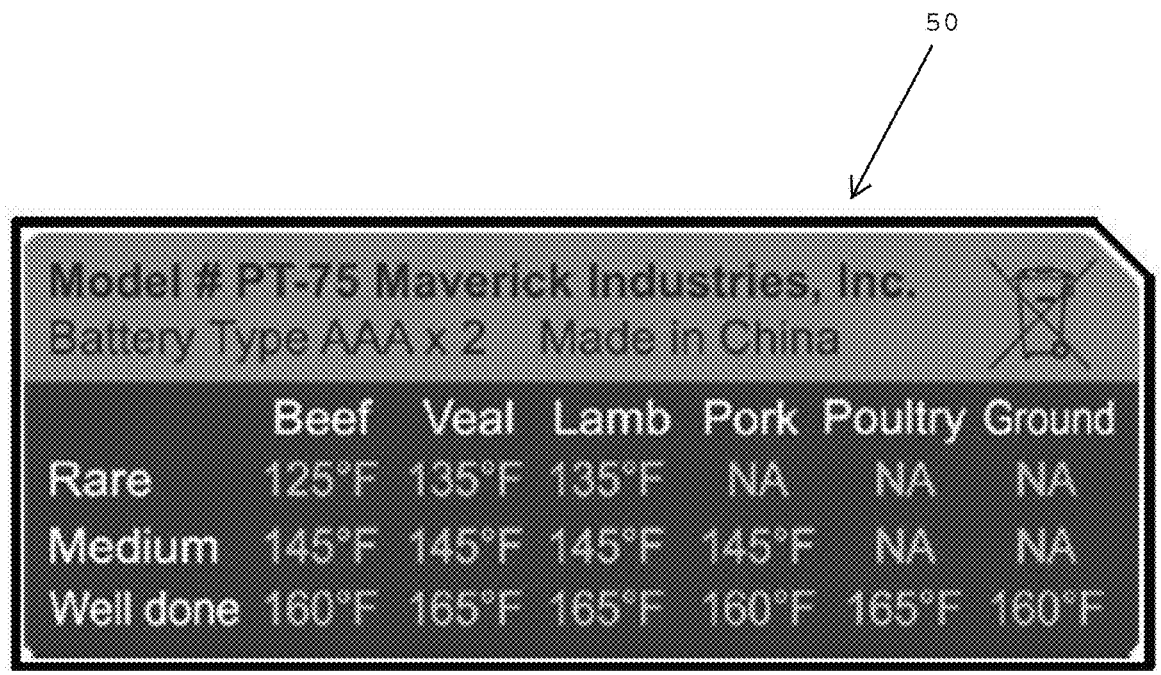
FIG. 2 shows a temperature chart for a cooking thermometer, in accordance with one embodiment of the present patent application.

Referring to FIGS. 1C-1 and 2, in one embodiment, the cooking thermometer 20 may have a temperature chart 50 applied to the outer surface of the housing 22. In one embodiment, the temperature chart 50 may be provided on the battery cover 42. During cooking and temperature monitoring operations, the temperature chart 50 may be utilized by a cook to determine the safe cooking temperatures for various types of meat and the different preferred doneness levels (e.g. rare, medium, well done, etc.) for various types of meat.

Figure 3:
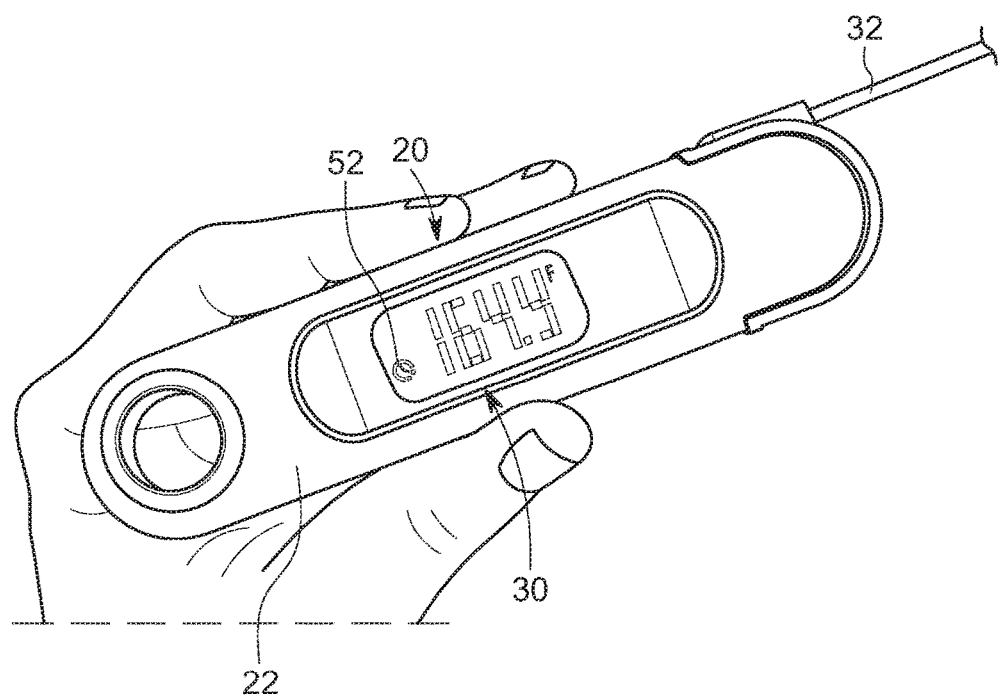
FIG. 3 shows the cooking thermometer of FIGS. 1A-1C with a temperature probe in an open position, in accordance with one embodiment of the present patent application.

Referring to FIG. 3, in one embodiment, the temperature probe release button 48 (FIG. 1B) may be engaged for releasing the temperature probe 32, whereupon the temperature probe 32 may be rotated into the open, extended position shown in FIG. 3. In one embodiment, the temperature probe 32 preferably remains locked in the extended position until the temperature probe release button is again engaged for enabling the temperature probe to be rotated back to the closed position. When the temperature probe 32 is in the open position, the cooking thermometer 20 displays the monitored temperature on the visualize display 30. The monitored temperature may be displayed in either Fahrenheit or Celsius. The distal tip of the temperature probe may be inserted into a food item being cooked (e.g., a steak) to determine the internal temperature of the food item. As noted above, the control button 46 (FIG. 1C) on the bottom of the housing 22 may be engaged for inverting the temperature reading shown on the visual display 30 to provide for either left hand or right hand use.

Figure 4:
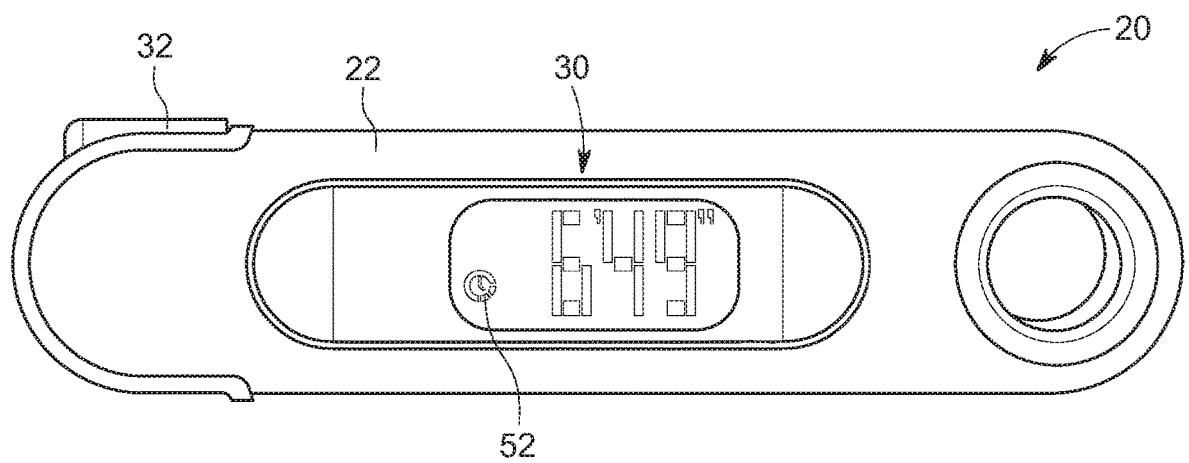
FIG. 4 shows the cooking thermometer of FIG. 3 after the temperature probe has been returned to a closed position, in accordance with one embodiment of the present patent application.

Referring to FIG. 4, in one embodiment, the cooking thermometer 20 preferably includes a central processing unit having one or more microprocessors, one or more memory devices, and one or more circuits. In one embodiment, the central processing unit is preferably programmed to provide a count up timer feature, which is desirably displayed on the visual display once the temperature probe 32 (FIG. 3) is returned from an open position for monitoring temperatures to a closed position. In one embodiment, the count up timer feature provides information to a cook regarding the period of time that has elapsed since the last temperature reading for a food item has been obtained. In one embodiment, the count up timer has a maximum count up to 99 minutes and 59 seconds.

Referring to FIG. 3, in one embodiment, the cooking thermometer 20 will turn on once the temperature probe 32 is moved to the open position. In one embodiment, a cook may press the control button 46 once (shown on the back of the housing 22 in FIG. 1C), which will display a timer icon 52 on the visual display 30 to provide an indication to a cook that the timer function has been enabled. After temperature readings have been obtained with the temperature probe in the open, extended position, the timer will start counting up when the temperature probe 32 is returned to the closed position. In one embodiment, if the timer counts past 10 minutes, the visual display will dim to save battery life. In one embodiment, the timer will stop counting by pressing the control button 46 once again. At that point, the timer will automatically stop and will return to the thermometer mode when the temperature probe 32 is opened.

FIG. 4 shows the temperature probe 32 in the closed position, whereby the distal tip 38 is stored inside the storage recess 34 of the housing 22 (FIG. 1B). The timer icon 52 is desirably activated on the visual display 30 and the visual display 30 displays the amount of time that has elapsed since the temperature 32 was closed. The count up timer feature preferably provides a user/cook with information regarding the amount of time that has elapsed since the last temperature reading has been obtained.

Figure 5:
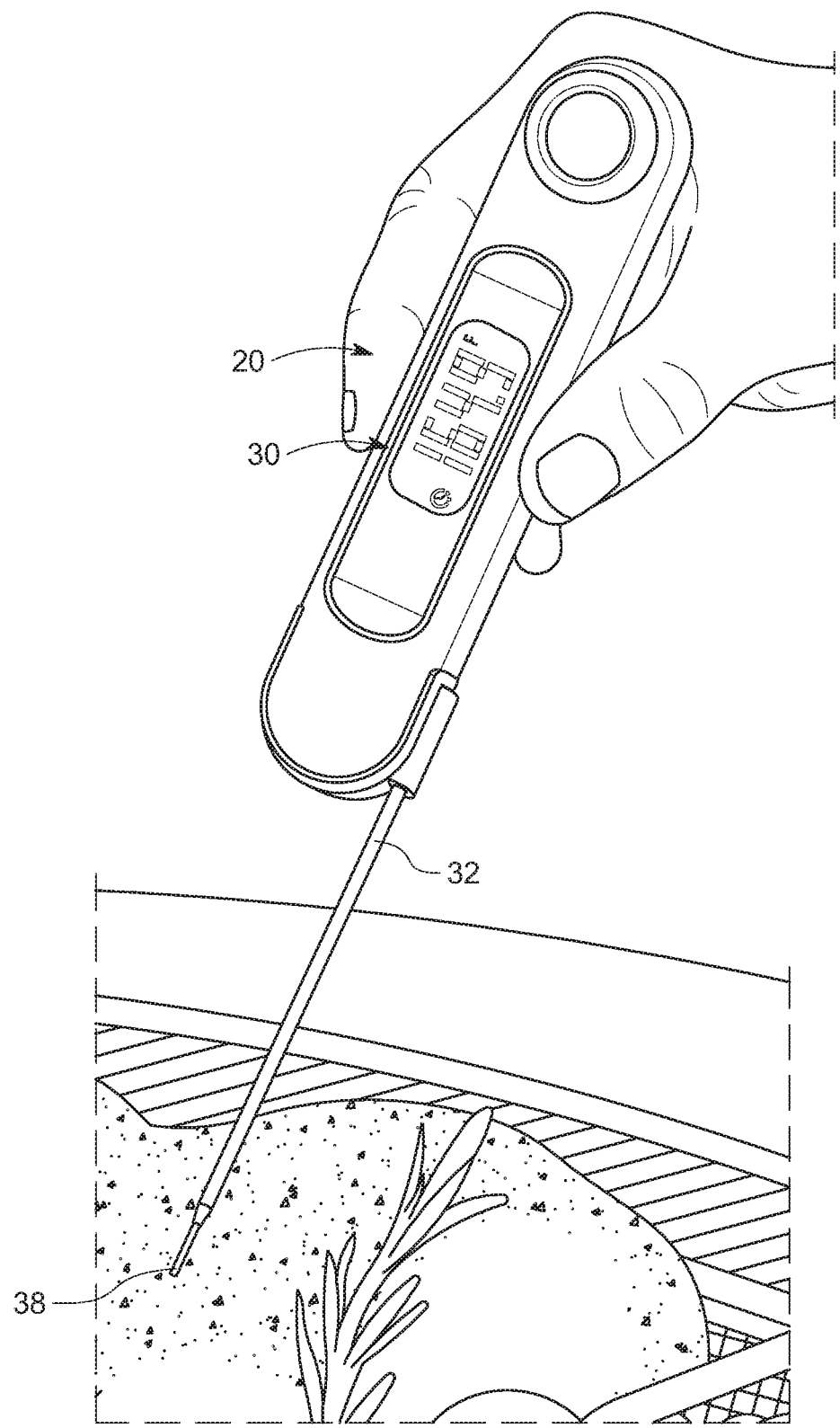
FIG. 5 shows the cooking thermometer of FIG. 3 and FIG. 4 with the temperature probe in an open position for monitoring the temperature of a food item on a barbeque grill, in accordance with one embodiment of the present patent application.

Referring to FIG. 5, in one embodiment, the cooking thermometer 20 may be utilized for monitoring the temperatures of food items during cooking operations. In FIG. 5, the temperature probe 32 is in an open, extended position and the distal tip 38 of the temperature probe 32 is inserted into a food item for obtaining an internal temperature reading for the food item. In FIG. 5, the visual display 30 provides an indication that the internal temperature of the food item is 164.9 degrees Fahrenheit. As temperature readings are being obtained, the cook may rotate the housing to the left-hand configuration shown in FIG. 3 for rotating the information shown on the visual display by 180 degrees. If desired, the cook may return the temperature probe 32 to a closed position (FIG. 4), whereupon the central processing unit of the cooking thermometer will revert to the count up timer feature shown and described above in FIG. 4.

Figure 6:
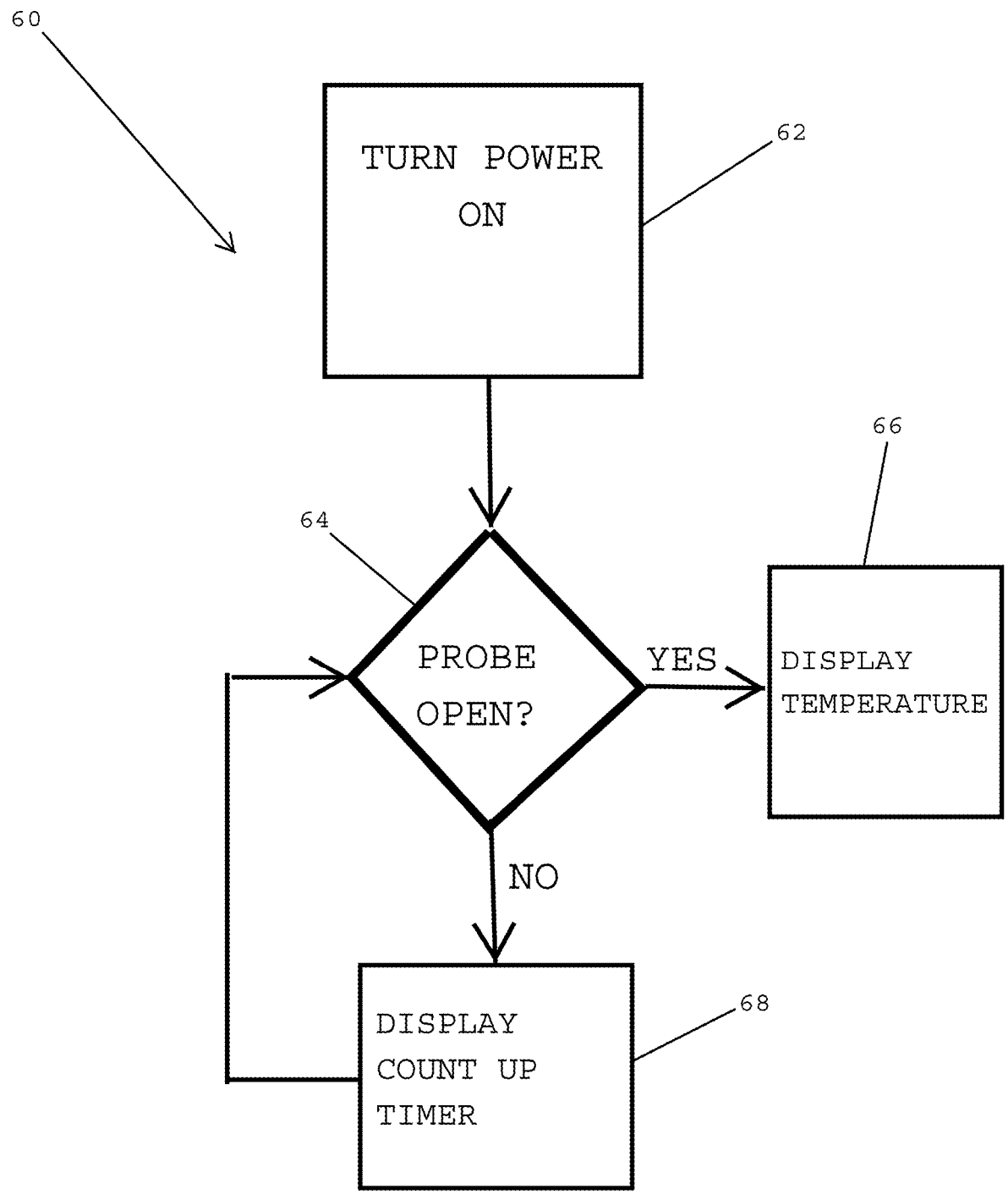
FIG. 6 shows a schematic view of a control program for operating the cooking thermometer shown in FIGS. 3-5, in accordance with one embodiment of the present patent application.

Referring to FIG. 6, in one embodiment, a cooking thermometer includes the central processing unit capable of operating one or more programs for alternating between a temperature monitoring configuration and a count up timer configuration. In one embodiment, at a first stage 62, the cooking thermometer is turned on. At stage 64, the central processing unit determines if the probe is in a closed configuration or an open configuration. If the probe is open, at step 66, the program displays the temperature reading (on the visual display) that has been obtained by the temperature probe. If the temperature probe is closed after it has been opened for monitoring temperatures, at step 68, the central processing unit will display a count up timer on the visual display. In one embodiment, the count up timer will continue to count up from 0 to 99 minutes, 59 seconds, which indicates the amount of time that has elapsed since the last temperature reading has been obtained and/or since the temperature probe has been moved from the open position to the closed position. After the count up timer has been activated, the program will desirably revert back to a display temperature mode if the temperature probe is opened once again for obtaining additional internal temperature readings for food items.

Figure 7A:
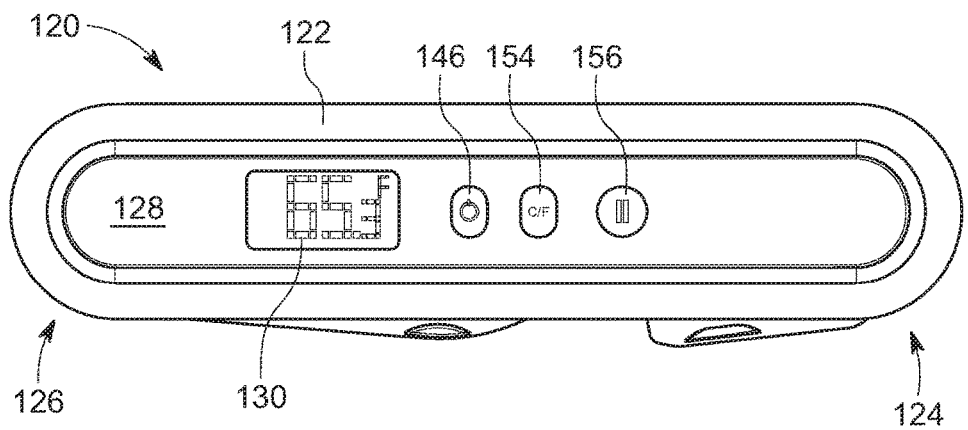
FIG. 7A shows a multi-function pocket knife having a cooking thermometer movable between a closed position and an open position for monitoring the temperature of food items, in accordance with one embodiment of the present patent application.
Figure 7B:
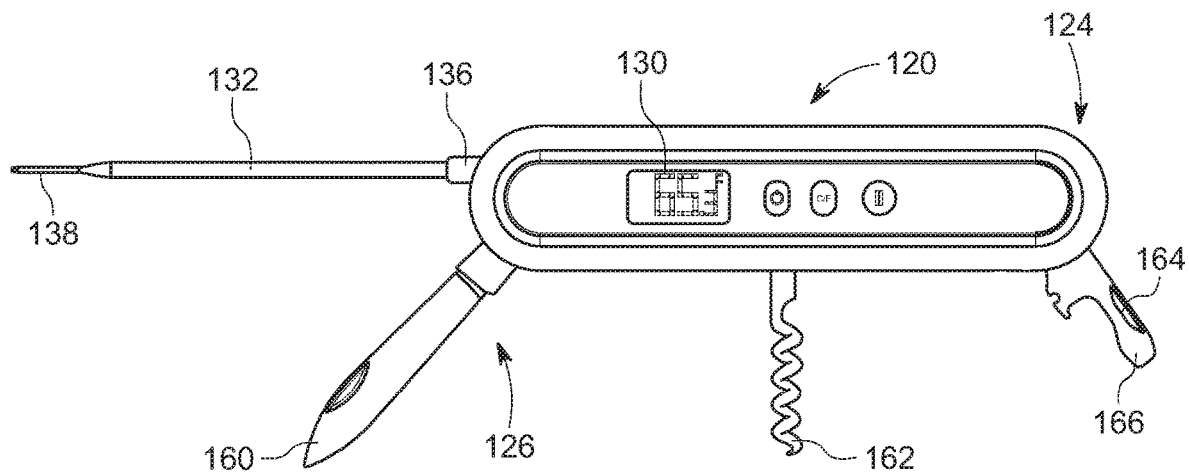
FIG. 7B shows the multi-function pocket knife of FIG. 7A with a temperature probe, a knife, a corkscrew, and a bottle opener in open positions, in accordance with one embodiment of the present patent application.

Referring to FIGS. 7A and 7B, in one embodiment, a multi-function pocketknife 120 preferably includes a housing 122 having a proximal end 124 and a distal end 126. In one embodiment, the multi-function pocketknife 120 has a topside 128 having a visual display 130, such as an LCD display, that shows temperature readings obtained by a temperature probe. The multi-function pocketknife 120 desirably includes a power on/power off button 146 for turning the pocketknife 120 on or off. In one embodiment, the multi-function pocketknife desirably includes a Celsius/Fahrenheit button 154 that may be depressed for toggling back and forth between displaying temperature readings in Fahrenheit or Celsius. In one embodiment, the multi-function pocketknife 120 preferably includes a stop button 156 that may be depressed for stopping the display of temperature readings on the visual display 130.

Referring to FIG. 7B, in one embodiment, the multi-function pocketknife 120 preferably includes a temperature probe 132 having a proximal end 136 that is rotatably secured to the distal end 126 of the housing 122. In one embodiment, the temperature probe 132 includes a distal tip 138 that is adapted to be inserted into food items for obtaining internal temperature readings for food items being cooked.

In one embodiment, the multi-function pocketknife 120 desirably includes a plurality of tools that may be moved between an open position and a closed position. In one embodiment, the multi-function pocketknife 120 includes a knife 160 that may move (e.g., rotate) between a closed position and an open position. In the closed position, the knife 160 is preferably stored inside the housing 122 of the multi-function pocketknife 120. In an open position, the knife 160 preferably extends beyond the outer perimeter of the housing 122 so that it may be used for cutting.

In one embodiment, the multi-function pocketknife 120 includes a corkscrew 162 that may be moved between a closed, storage position and an open position in which it extends from the housing 122 so that it may be used for removing a cork from a bottle.

In one embodiment, the multi-function pocketknife 120 preferably includes a bottle opener 164 that may be moved from a closed, storage position and an open position for removing the lids from the tops of bottles. In one embodiment, the bottle opener 164 has a distal end including a flat tip 166 that may be used as a screwdriver. In other embodiments, a multi-function pocket knife may have other types of tool coupled with the housing (e.g., a file, a Phillips head screwdriver, a wedge, etc.).

In one embodiment, the multi-function pocketknife 120 has a central processing unit and one or more programs that are similar to the control system described above for the cooking thermometer shown in FIGS. 1A-5. In one embodiment, the multi-function pocketknife 120 preferably has a temperature reading mode when the temperature probe 132 is in the open, extended position shown in FIG. 7B. When the temperature probe 132 is in the open, extended position, the temperature probe 132 will desirably obtain temperature readings that are displayed on the visual display 130 in either Fahrenheit or Celsius. In one embodiment, after temperature readings have been obtained, the pocketknife 120 will revert to a count up timer configuration when the temperature probe 132 is closed and stored inside the housing 122 of the multi-function pocketknife 120. In the count up timer configuration, the amount of time that has elapsed since the last temperature reading will be shown on the visual display 130. In one embodiment, the central processing unit is capable of counting up to 99 minutes, 59 seconds, after the temperature probe 132 has been moved into the closed position. In other embodiments, the count up time may count up to more than 99 minutes, 59 seconds.

Figure 8:
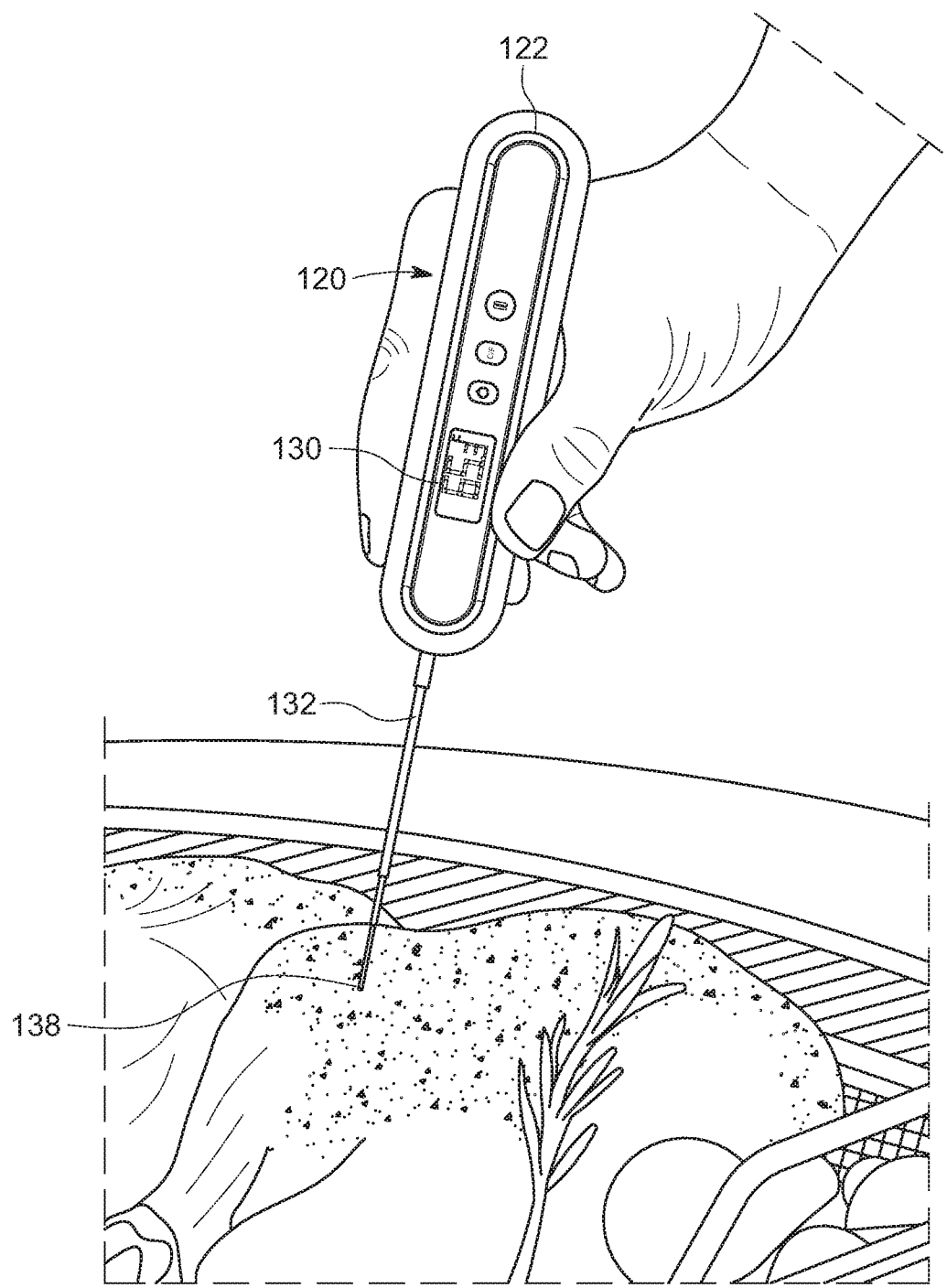
FIG. 8 shows the multi-function pocketknife of FIGS. 7A and 7B with the temperature probe in an open position for monitoring the temperature of a food item being cooked on a barbeque grill, in accordance with one embodiment of the present patent application.

Referring to FIG. 8, in one embodiment, the multi-function pocketknife 120 may be utilized by cooks for monitoring the internal cooking temperatures of food items. In FIG. 8, the temperature probe 132 has been rotated into the open, extended position so that the distal tip 138 may be inserted into a food item. The temperature reading obtained by the sensor in the distal tip 138 is processed by the control system and preferably displayed on the visual display 130 of the housing 122. In one embodiment, after the multi-function pocketknife 120 has been used to obtain temperature readings of food items, the temperature probe 132 may be rotated back into a closed position for commencing the count up timer program stored in the central processing unit. At this stage, when the count up timer feature is activated, the amount of time that has elapsed since the last temperature reading will be displayed on the visual display 130 of the housing 122.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A multi-function cooking tool comprising:
   a housing having a proximal end and a distal end;
   an electronic visual display provided on said housing;
   a temperature probe coupled with said housing, said temperature probe being moveable between a first position in which said temperature probe is stored inside said housing and a second position in which said temperature probe extends from said housing;
   a control system disposed in said housing and being in communication with said temperature probe and said electronic visual display, wherein when said temperature probe is in the second position said control system is programmed to display information on said electronic visual display that corresponds to temperature readings sensed by said temperature probe, and wherein when said temperature probe is returned from the second position to the first position said control system is programmed to commence a count-up timer program that displays on said electronic visual display the amount of time that has elapsed since said temperature probe was moved from the second position to the first position.

2. The multi-function cooking tool as claimed in claim 1, wherein said count-up timer program counts up from zero to infinity to indicate the amount of time that has elapsed since the last temperature reading.

3. The multi-function cooking tool as claimed in claim 2, wherein said count-up timer program counts up from zero to 99 minutes, 59 seconds.

4. The multi-function cooking tool as claimed in claim 1, wherein said temperature probe has a proximal end that is pivotally coupled with said distal end of said housing for enabling said temperature probe to pivot between the first position in which said probe is stored inside said housing and the second position in which said probe extends distally beyond said distal end of said housing.

5. The multi-function cooking tool as claimed in claim 4, wherein said housing includes a storage recess formed in a side of said housing that is adapted to receive a distal end of said temperature probe when said temperature probe is in the first position.

6. The multi-function cooking tool as claimed in claim 5, further comprising a temperature probe release button provided on said housing, wherein said temperature probe release button has a lock position for locking said temperature probe in the first position inside said temperature probe storage recess and a release position for unlocking said temperature probe for enabling said temperature probe to pivot between the first position and the second position.

7. The multi-function cooking tool as claimed in claim 4, wherein said temperature probe has a distal end including a distal tip that contains a thermocouple sensor adapted to sense the temperature readings and transmit the sensed temperature readings to said system controller.

8. The multi-function cooking tool as claimed in claim 1, wherein said housing comprises an eyelet located adjacent said proximal end of said housing for enabling said multi-function cooking tool to be hung.

9. The multi-function cooking tool as claimed in claim 1, further comprising a control button accessible on said housing for interacting with said system controller.

10. The multi-function cooking tool as claimed in claim 1, wherein cooking tool is a pocket knife, and wherein said housing contains a plurality of tools moveable between retracted and extended positions.

11. The multi-function cooking tool as claimed in claim 10, wherein said tools are selected from the group consisting of a knife, a corkscrew, a bottle opener and a screw driver.

12. A multi-function cooking tool comprising:
   a housing having a proximal end and a distal end;
   an electronic visual display provided on said housing;
   a temperature probe having a proximal end pivotally coupled with said housing and a distal end, said temperature probe being pivotable between a first position in which said distal end of said temperature probe is stored inside said housing and a second position in which said distal end of said temperature probe extends beyond said distal end of said housing;
   a control system disposed in said housing and being in communication with said temperature probe and said electronic visual display, wherein when said temperature probe is pivoted from the first position to the second position said control system is programmed to display information on said electronic visual display that corresponds to the temperature readings sensed by said distal end of said temperature probe, and wherein when said temperature probe is pivoted back from the second position to the first position said control system is programmed to commence a count-up timer program that displays on said electronic visual display the amount of time that has elapsed since said temperature probe was pivoted back from the second position to the first position.

13. The multi-function cooking tool as claimed in claim 12, wherein said count-up timer program counts up from zero to infinity to indicate the amount of time that has elapsed since said temperature probe was pivoted back from the second position to the first position.

14. The multi-function cooking tool as claimed in claim 12, wherein said housing includes a storage recess formed in a side of said housing that is adapted to receive a distal end of said temperature probe when said temperature probe is in the first position.

15. The multi-function cooking tool as claimed in claim 14, further comprising a temperature probe release button provided on said housing that is located adjacent said storage recess, wherein said temperature probe release button has a lock position for locking said temperature probe in the first position inside said temperature probe storage recess and a release position for unlocking said temperature probe so as to enable said temperature probe to pivot from the first position to the second position.

16. The multi-function cooking tool as claimed in claim 15, wherein said distal end of said temperature probe comprises a distal tip that contains a thermocouple sensor adapted to sense the temperature readings and transmit the sensed temperature readings to said system controller.

17. The multi-function cooking tool as claimed in claim 15, further comprising a control button accessible on said housing for interacting with said system controller.

18. A multi-function cooking tool comprising:
a housing having a proximal end and a distal end, wherein said housing contains a plurality of tools moveable between retracted and extended positions;
an electronic visual display provided on said housing;
a temperature probe having a proximal end pivotally coupled with said housing and a distal end, said temperature probe being pivotable between a first position in which said distal end of said temperature probe is stored inside said housing and a second position in which said distal end of said temperature probe extends distally beyond said distal end of said housing;
a control system disposed in said housing and being in communication with said temperature probe and said electronic visual display, wherein when said temperature probe is pivoted from the first position to the second position said control system is programmed to display information on said electronic visual display that corresponds to the temperature readings sensed by said distal end of said temperature probe, and wherein when said temperature probe is pivoted from the second position back to the first position said control system is programmed to commence a count-up timer program that displays on said electronic visual display the amount of time that has elapsed since said temperature probe was pivoted from the second position back to the first position.

19. The multi-function cooking tool as claimed in claim 18, wherein cooking tool is a pocket knife, and wherein said tools are selected from the group consisting of a knife, a corkscrew, a bottle opener and a screw driver.

20. The multi-function cooking tool as claimed in claim 18, wherein said count-up timer program counts up from zero to infinity to indicate the amount of time that has elapsed since said temperature probe was pivoted from the second position back to the first position, and wherein said housing includes a storage recess formed in a side of said housing that is adapted to receive a distal end of said temperature probe when said temperature probe is in the first position.

* * * * *